United States Patent [19]
Grant

[11] Patent Number: 5,142,182
[45] Date of Patent: Aug. 25, 1992

[54] ADJUSTABLE WIDTH CAPS FOR INSULATING SERIES LOOPS ON BAR WOUND ARMATURES IN ELECTRICAL SYSTEMS

[75] Inventor: James J. Grant, Schenectady, N.Y.

[73] Assignee: General Electric Company, Schenectady, N.Y.

[21] Appl. No.: 715,678

[22] Filed: Jun. 14, 1991

[51] Int. Cl.⁵ .............................................. H02K 03/46
[52] U.S. Cl. ...................................... 310/270; 310/43; 310/91; 310/260
[58] Field of Search .................... 310/43, 45, 91, 201, 310/260, 270; 229/901, 101; 220/627, 626

[56] References Cited

U.S. PATENT DOCUMENTS

| | | | |
|---|---|---|---|
| 2,556,568 | 6/1951 | Aikman | 229/101 |
| 3,151,260 | 9/1964 | MacCracken, Jr. et al. | 310/43 |
| 3,648,091 | 3/1972 | Kostin et al. | 310/260 |
| 4,151,434 | 4/1979 | Zonz et al. | 310/71 |
| 4,309,636 | 1/1982 | Pollok | 310/260 |
| 4,759,495 | 7/1988 | Moon | 229/101 |
| 4,786,834 | 11/1988 | Grant et al. | 310/194 |
| 4,864,176 | 9/1989 | Miller et al. | 310/194 |
| 5,001,378 | 3/1991 | Miller et al. | 310/178 |

Primary Examiner—Steven L. Stephan
Assistant Examiner—Dennis R. Haszko
Attorney, Agent, or Firm—Nixon & Vanderhye, P.C.

[57] ABSTRACT

The cap for the series loop includes a pair of identical cap sections each having side walls, an end wall having first and second segments offset in a longitudinal direction and a cover extending between the side walls and from the end wall on one side of the cap. A longitudinally extending tab lies adjacent one side wall defining a slot for receiving an opposite wall section of the other cap section when assembled. In assembly, the side walls and end wall segments of the respective cap sections are respectively intermeshed to form an enclosure open at one end for receiving the series loop, the enclosure being adjustable in width depending upon the magnitude of the intermeshing of the sections.

23 Claims, 4 Drawing Sheets

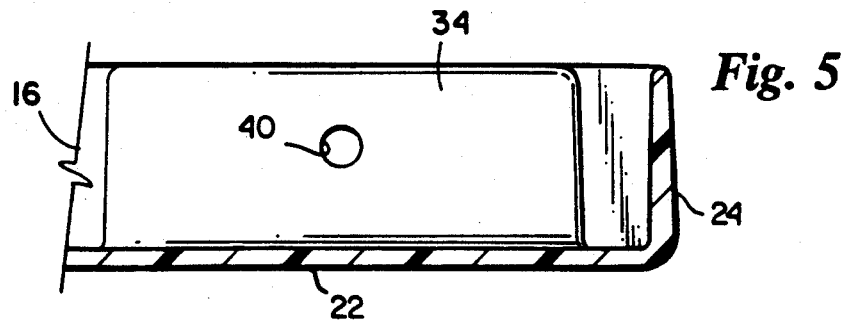
*Fig. 5*
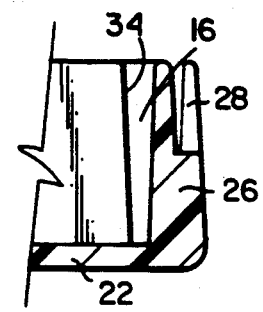
*Fig. 6*
*Fig. 7a*
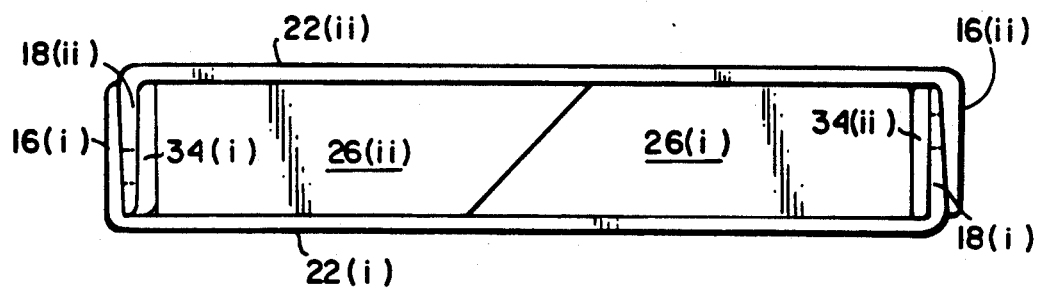
*Fig. 7b*
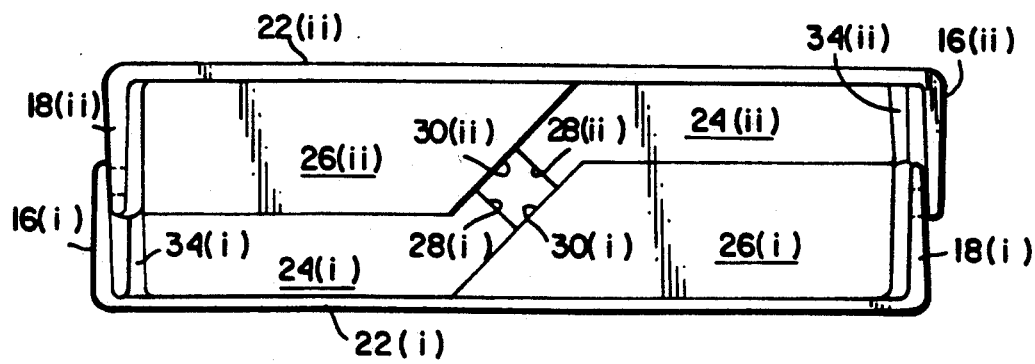

ADJUSTABLE WIDTH CAPS FOR INSULATING SERIES LOOPS ON BAR WOUND ARMATURES IN ELECTRICAL SYSTEMS

BACKGROUND AND SUMMARY OF THE IVNENTION

The present invention relates to a molded cap for insulating series loop connections on bar wound armatures of electrical systems, for example, generators, and particularly relates to a pair of homomorphic sections for assembly to form a cap enclosure of selected width to accommodate variations in series loop dimensions which would otherwise require caps of different sizes.

Molded caps for insulating series loop connections in electrical systems, for example, turbo-generators, have recently, in many applications, replaced resin-filled mica tapes previously wrapped about the series loop connections. Notwithstanding the use of new molded caps for this purpose, electrical systems, including generators, are currently being designed with series loops on their armatures having shapes which are very difficult to tape or accommodate in a particular molded cap. While the caps have afforded large cost savings in time and materials and higher quality series loops, the molded caps heretofore have the disadvantage that different size caps are required for different size series loop connections. This has led to high tooling costs to make caps of different sizes and, as a consequence, the molded caps, while an improvement over the resin-filled mica tapes, have been applied only to high-production electrical systems. Stated differently, because of the lack of dimensional commonality in electrical systems design, the application of a particular sized cap to series loops is limited. At the same time, it has become increasingly desirable to apply molded caps to conventional electrical systems such as generators, including older generators when they are rewound.

Conventional molded caps are essentially five-sided boxes each having a pair of opposed side walls, an end wall, and covers spaced one from the other along opposite sides of the cap, leaving an open end through which the loop may be received. The caps are conventionally molded from glass-reinforced thermoset materials. To install these conventional caps, they are generally filled with a thermoset potting compound and pushed over the series loop. In certain instances, the potting compound is injected into the cap after it has been placed on the series loop.

A clamshell-type cap has also recently been designed and has the advantage of requiring less filler material and a less massive series loop. However, the clamshell design is less versatile than the conventional molded cap and is generally contoured around the series loop such that relatively little variation in loop size may be accommodated. Because it cannot be pushed axially over the series loop as a conventional cap, additional clearance between adjacent series loops is necessary. Significantly, tooling costs are much higher for the clamshell-type cap because the two halves require two different molds.

According to the present invention, there is provided a molded cap formed of two identical or homomorphic cap sections which, during assembly to form a series loop cap enclosure, are adjustable in width to form a cap enclosure for receiving a number of different sized series loops. For example, while the length and height of the series loops are very closely related, the width of the loops vary greatly between otherwise similar designs and particularly vary according to the type of the series loop connection. For example, a series loop with a strand-to-strand braze is much narrower than a series loop with a single-shot braze connection, the latter being about twice as wide as the strand-to-strand braze, although their length and height dimensions are similar. Thus, the present invention provides a molded cap formed of two identical cap sections which, during assembly, are adjustable in width to accommodate different designs of series loops.

To accomplish those ends, two identical cap sections, formed of dielectric material, are assembled together to form a five-sided enclosure with an open end for receiving the series loop. Each cap section includes a pair of spaced side walls, an end wall interconnecting the side walls at one of the section and a cover extending between the side walls and from the end wall along one side of the cap section, leaving free the margins of the side and end walls along the opposite side of the cap section. To permit assembly of the two cap sections to form the cap, each end wall has first and second generally parallel segments offset longitudinally one from the other. These segments have edges inset from the free margin of the end wall at a location substantially medially of the length of the end wall to define an inset portion or opening extending at least equal to one half the depth of the end wall. Additionally, a longitudinally extending tab is disposed adjacent to one of the side walls in generally parallel relation therewith and adjacent the end wall to define a slot with the one side wall for receiving an opposite side wall portion of the other cap section when the cap sections are assembled. A rib also projects inwardly from the opposite side wall at a location from the end wall a distance in excess of the length of the tab. The tab has an opening and the opposite side wall has an opening for facilitating securement of the sections one to the other as set forth hereinafter.

To assemble the cap sections to form the cap, the side walls and end wall segments are respectively intermeshed or nested whereby the cap sections in final assembly are transversely offset a distance corresponding substantially to the width of a side wall while simultaneously aligned in the longitudinal direction. Thus, the side walls of a first cap section lie in generally parallel juxtaposition with the respective side walls of the second cap section. More particularly, the first side wall of the first cap section lies outwardly of the corresponding second side wall of the second cap section while the second opposite side wall of the first section lies inwardly of the first opposite side wall of the second section. Additionally, the second side wall of the first cap section has a portion which lies between the first side wall and tab of the second cap section while the second side wall of the second section has a portion which lies between the first side wall and tab of the first cap section. The first and second end wall segments of the first section lie in side-by-side generally parallel relation with the respective second and first end wall segments of the second section. The inset edges of the first and second segments of each end wall defining the inset portion medially of the length of the end wall enable an intermeshing of the first and second segments of the end walls of the respective cap sections and the respective side walls. The covers of the first and second sections lie in spaced opposition one to the other. Thus, the covers, side walls and end walls define a generally five-sided enclosure open at an end thereof opposite the end walls for receiving the series loop of the armature.

It will thus be appreciated that, when assembling the cap sections, the covers may be selectively spaced one from the other, depending upon the extent to which the side walls and end walls intermesh. Thus, the cap sections can be disposed in close-fitting intermeshed and/or interdigitated relation one to the other for receiving a relatively narrow series loop with strand-to-strand braze or can be formed to a wider configuration for receiving the wider series loop with single-shot braze. Of course, different configurations of loops, as well as different thicknesses of loops can likewise be accommodated.

To mechanically lock the two cap sections one to the other, potting resin is disposed within the cap sections and fills the openings in the tabs and opposite side walls. The potting resin in those openings forms locking pins which hold the cap sections captive to one another in the event of a bond failure.

Additionally, the cap sections may be assembled prior to assembly over the loop or they may be assembled as a clamshell-type cap. Thus, the potting resin may be disposed in the two cap sections and the sections assembled together and subsequently pushed over the series loop. Alternatively, the cap sections may be closed about the loop, as in a clamshell configuration. The cap sections may be temporarily held together with spring clamps or large rubber bands while the potting resin cures. Alternatively, the cap may be tied in a closed condition with permanent banding tape serving to lock the cap on the loop.

In a preferred embodiment according to the present invention, there is provided a cap for disposition on the series loop of a bar wound armature of an electrical system, comprising first and second substantially identical cap sections, each section having (i) first and second opposed generally parallel longitudinally extending side walls, (ii) an end wall extending generally transversely between the side walls adjacent one end of the section and (iii) a cover extending between the side walls and from the end wall along one side of the cap section leaving free the margins of the side and end walls along the opposite side of the cap section. Each end wall has first and second generally parallel segments offset one from the other in the longitudinal direction with the second segment being inset longitudinally from the first segment, each first end wall segment extending from the first side wall generally transversely toward the second side wall, each the second end wall segment extending from the second side wall generally transversely toward the first side wall, the first and second segments having edges inset from the free margin of the end wall at a location therealong intermediate the side walls. The first and second sections are assembled to form the cap with (i) the first and second side walls of the first section lying generally parallel and side-by-side with the respective second and first side walls of the second section, (ii) the first and second end wall segments of the first section lying in side-by-side generally parallel relation with the respective second and first segments of the second section, and (iii) the covers of the first and second sections spaced one from the other on opposite sides of the cap whereby the covers, the side walls and the end walls define an enclosure open at the end thereof opposite the end walls for receiving the series loop of a bar wound armature. The inset edges of the first and second segments of the first section and the inset edges of the first and second segments of the second section enable the respective side walls of the first and second cap sections and the respective end wall segments thereof to intermesh and thereby form the cap.

In a further preferred embodiment according to the present invention, there is provided a cap enclosure portion for disposition on the loop of a bar wound armature of an electrical system, comprising a cap section having (i) a pair of opposed generally parallel longitudinally extending side walls, (ii) an end wall extending generally transversely between the side walls adjacent one end of the section and (iii) a cover extending between the side walls and from the end wall along one side of the cap section leaving free the margins of the side and end walls along the opposite side of the cap section. The end wall has first and second generally parallel segments offset one from the other in the longitudinal direction with the second segment being inset longitudinally from the first segment, the first and second end wall segments each extending transversely from a respective side wall generally toward the opposite side wall. The first and second segments have edges inset from the free margin of the end wall and define an opening in the end wall and which opening opens through the margin of the end wall, the section further including a longitudinally extending tab spaced closely adjacent and substantially parallel to one of the side walls to define a slot therewith having a width at least equal to the width of the opposite side wall section.

In a further preferred embodiment according to the present invention, there is provided a cap for disposition on the loop of a bar wound armature of an electrical system, comprising first and second substantially identical cap sections, each section having (i) a pair of opposed generally parallel longitudinally extending side walls, (ii) an end wall extending generally transversely between the side walls adjacent one end of the section and (iii) a cover extending between the side walls and from the end wall along one side of the cap section leaving free the margins of the side and end walls along the opposite side of the cap section. Each end wall has first and second generally parallel segments offset one from the other in the longitudinal direction with the second segment being inset longitudinally from the first segment, the first and second segments having edges defining a portion inset from the free margin of the end wall and disposed substantially medially of the end wall, the first and second sections being assembled to form the cap with (i) the side walls of the first section lying in generally parallel juxtaposition with the respective side walls of the second section, (ii) the first and second end wall segments of the first section lying in side-by-side generally parallel relation with the respective second and first segments of the second section, and (iii) the covers of the first and second sections lying in spaced opposition one to the other whereby the covers, the side walls and the end walls define an enclosure open at the end thereof opposite the end walls for receiving the loop of the bar wound armature, the inset portions of the first and second cap sections enabling offset intermeshing of the sections in a transverse direction when assembled to form a cap.

Accordingly, it is a primary object of the present invention to provide a novel and improved cap for enclosing series loops of an armature in an electrical system wherein the cap is formed of two identical sections from a single mold and which cap sections can be readily and easily assembled in intermeshed transversely offset and longitudinally aligned relation to one another to define a cap having a selected width whereby series loops of different sizes, particularly widths may be accommodated.

These and further objects and advantages of the present invention will become more apparent upon reference to the following specification, appended claims and drawings.

BRIEF DESCRIPTION OF THE DRAWING FIGURES

FIG. 5 is an enlarged fragmentary cross-sectional view thereof taken generally about on line 5—5 in FIG. 3;

FIG. 6 is a cross-sectional view thereof taken generally about on line 6—6 in FIG. 4;

FIGS. 7a and 7b are end elevational views of the cap formed by the cap sections in assembly illustrating the manner of adjusting the cap to selected widths;

DETAILED DESCRIPTION OF THE DRAWING FIGURES

Reference will now be made in detail to a present preferred embodiment of the invention, an example of which is illustrated in the accompanying drawings.

Figure 1:
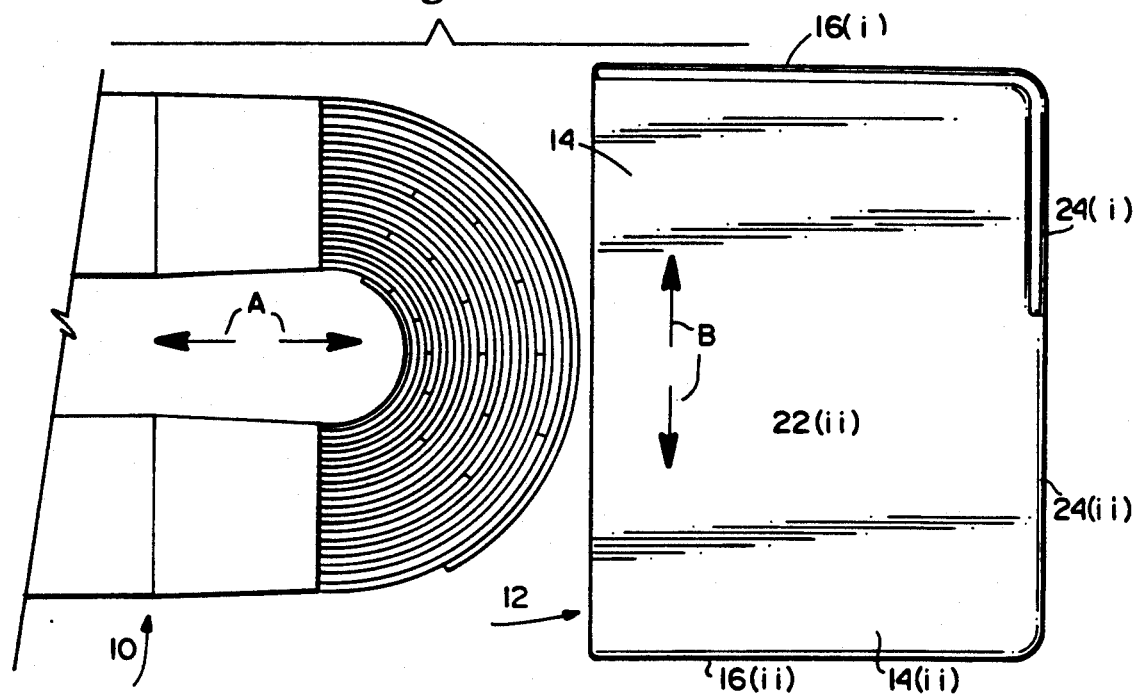
FIG. 1 is a fragmentary side elevational view of a series loop connection for a bar wound armature with a cap illustrated for being received over the end of the series loop.

Referring now to the drawings, particularly to FIG. 1, there is illustrated a series loop, generally designated 10, with a strand-to-strand brazed connection, and a cap, generally designated 12, for overlying and receiving the end of the series loop connection 10. Cap 12 is formed of two identical or homomorphic cap sections 14 assembled together to form essentially a five-sided enclosure having opposed spaced side walls, an end wall, a pair of covers spaced one from the other and an opening opposite the end wall for receiving the series loop connection.

Figure 3:
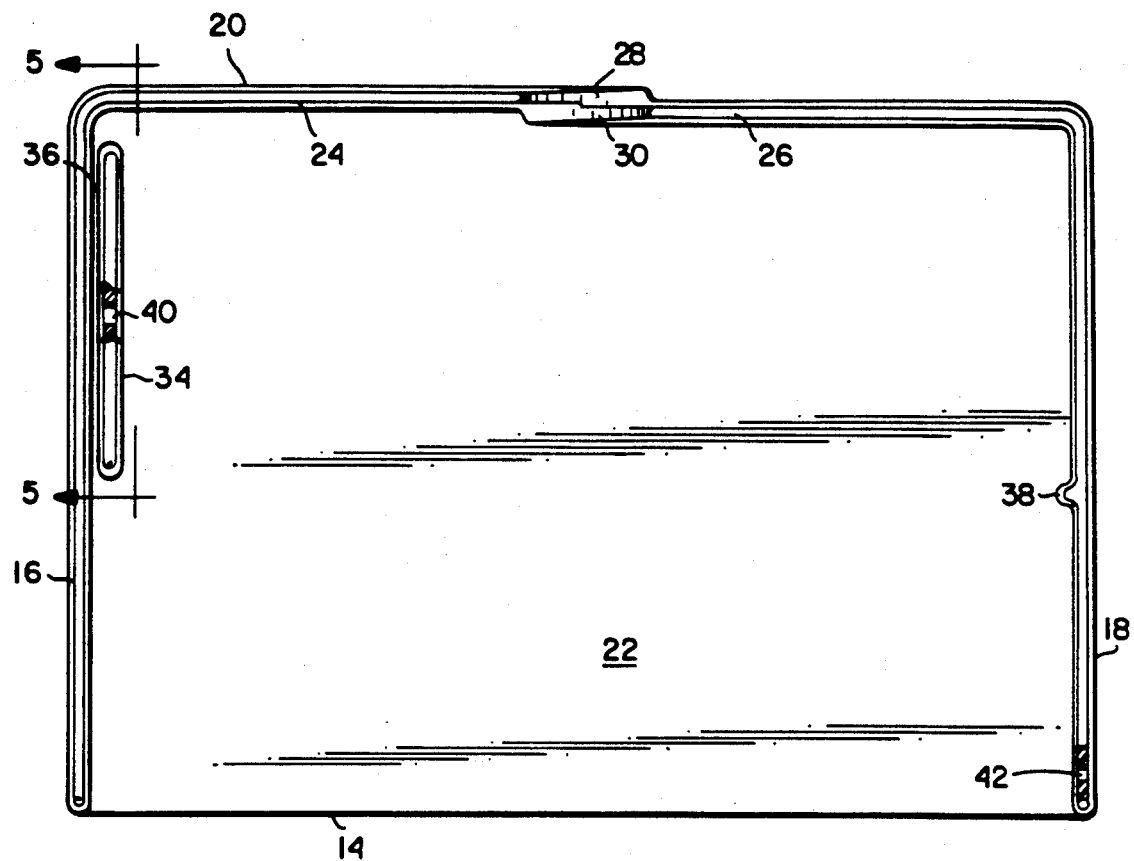
FIG. 3 is a side elevational view of a cap section, two of which sections form the cap illustrated in FIGS. 1 and 2.
Figure 4:
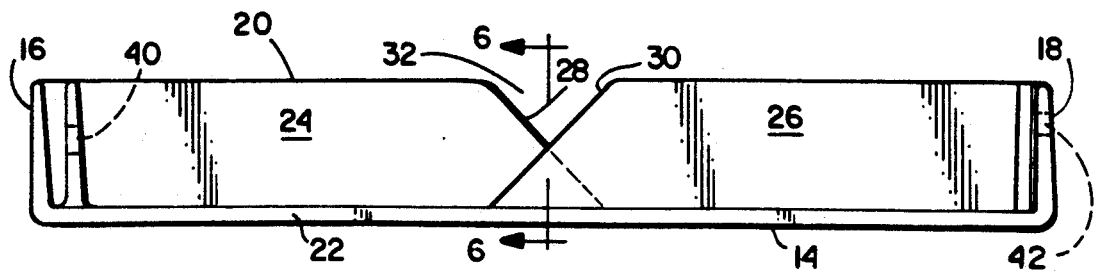
FIG. 4 is an end elevational view of the cap section of FIG. 3.

Referring to drawing FIGS. 3 and 4, the cap section 14 includes a pair of spaced side walls, e.g., first and second side walls 16 and 18, respectively, an end wall 20 interconnecting said side walls 16 and 18 at one end of cap section 14 and a cover 22 extending between side walls 16 and 18 and from end wall 20, leaving free, as illustrated in FIG. 4, the margins of the side and end walls along the side of the cap section opposite the cover 22 (the upper side as illustrated).

End wall 20 is comprised of a pair of end wall segments, e.g., first and second end wall segments 24 and 26, respectively. End wall segments 24 and 26 extend generally parallel one to the other but are offset in a longitudinal direction. (For purposes of this description, the longitudinal direction in FIG. 1 lies in the directions of the arrow A, whereas the transverse direction extends in the directions of the arrow B, i.e., from one side wall to another). Longitudinally offset end wall segments 24 and 26 have edges 28 and 30, respectively, which extend from the free margins of the end wall segments inwardly toward the opposite cover 22. Edges 28 and 30 are also inclined toward one another to define an inset portion or opening 32 at least equal to one-half of the depth of the end wall 20, as illustrated in FIG. 4. Thus, edges 28 and 30 lie longitudinally offset one from the other. Additionally, edges 28 and 30 and inset portion 32 defined thereby lie substantially medially of the length of end wall 20, for reasons which will become apparent from the ensuing description. It will be appreciated, however, that inset portions defined by inclined edges such as edges 28 and 30 may be located at spaced locations along end wall 20, rather than medially as illustrated, provided such edges can intermesh one with the other when the cap sections are assembled, as set forth in the ensuing description. The opposite end of cap section 14 is defined by the free end edges of side walls 16 and cover 22.

As best illustrated in FIGS. 3, 4 and 5, a longitudinally extending tab 34 is disposed adjacent first side wall 16 in generally parallel relation therewith and extends from a location adjacent end wall 20 to a location intermediate the longitudinal extent of the cap section. Tab 34 thus defines a slot 36 with side wall portion 16 in juxtaposition therewith for receiving, in assembly, a portion of the opposite second side wall 18. Tab 34 extends from the cover 22 and is preferably of the same depth as side wall 16. Tab 34 may, however, be secured to side wall 16 adjacent cover 22 and does not necessarily require securement to cover 22. Along the opposite side wall 18, there is provided a rib 38. Rib 38 is disposed at a longitudinal location along side wall 18 beyond the tab 34.

To assist in securing cap sections 14 one to the other in assembly, an opening 40 is formed through tab 34. A similar opening 42 is formed through the second side wall 18 adjacent its distal end. It will be appreciated that, with the foregoing construction of the cap sections, each cap section may be formed of a dielectric material, for example, a resin, formed in a single mold whereby an assembly of a pair of such homomorphic or identical cap sections may form the cap for receiving the series loop connection.

To assemble a pair of cap sections 14 to form cap 12, the side walls and end wall segments are respectively intermeshed whereby the cap sections, in final assembly, are transversely offset one from the other a distance corresponding substantially to the width of a side wall. The cap sections 14 are, however, longitudinally aligned one with the other. This longitudinal offset can be seen in FIG. 1, wherein the first side wall 16 of a first cap section and a first end wall segment 24 is illustrated, whereas the cover 22, and first end wall segment 24 and first side wall 16 of a second cap section are illustrated. For convenience in describing the assembly, the letter notations (i) and (ii) are used to denote the various parts of the first and second cap sections, respectively, in assembly.

Thus, when identical cap sections 14 are intermeshed one with the other, side walls 16(i) and 18(i) of cap section 14(i) lie in generally parallel juxtaposition with the respective side walls 18(ii) and 16(ii), respectively, of the second cap section 14(ii). First side wall 16(i) of the first cap section 14(i) lies outwardly of side wall 18(ii) of second cap section 14(ii). Conversely, the first side wall 16(ii) of second cap section 14(ii) lies outwardly of second wall 18(i) of first cap section 14(i). Note also that a portion of side wall 18(ii) of second cap section 14(ii) lies between tab 34(i) and side wall 16(i) of first cap section 14(i) and inwardly of rib 38(ii) of second cap section 14(ii). Similarly, a portion of side wall 18(i) of first cap section 14(i) lies between tab 34(ii) and side wall 16(ii) of second cap section 14(ii). In each case, rib 38 lies between the end of tab 34 and the open end of the enclosure formed thereby.

Figure 2:
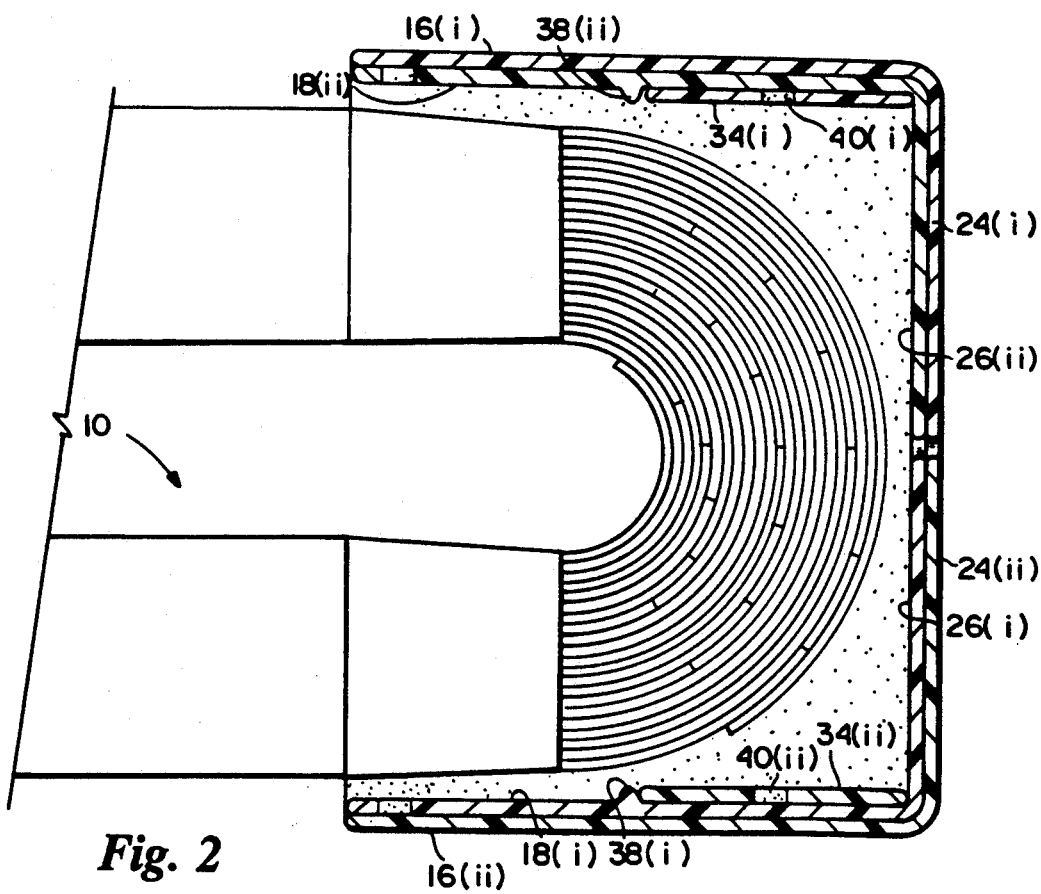
FIG. 2 is an enlarged cross-sectional view thereof with the cap applied over the end of the series loop.

A review of FIG. 2 also reveals that first and second end wall segments 24(i) and 26(i) of the first cap section 14(i) lie in side-by-side parallel relation with respective second and first end wall segments 26(ii) and 24(ii) of second cap section 14(ii). It will also be appreciated from a review of FIG. 7b that the inset edges of the end wall segments of each cap section respectively intermesh with the inset edges of the end wall segments of the other second cap section. Thus, the cap sections are transversely offset one from the other, as illustrated in FIG. 1, but are longitudinally aligned one with the other. The inset edges 28 and 30 accommodate the longitudinal alignment and transverse offset. It will also be appreciated from a review of FIGS. 7a and 7b that the cap sections may be assembled to selected widths, depending upon the degree to which the sections are intermeshed.

To lock the cap sections in assembled relation one with the other, a potting resin may be disposed in the cap sections in the openings 40 and 42. The potting resin thus forms locking pins in assembly when the resin is cured.

It will be appreciated that the cap sections may be assembled directly onto the series loop connections. Thus, the cap sections may be disposed on opposite sides of a series loop and pressed toward one another, with the side walls and end wall segments intermeshing with one another, respectively, as previously described. Alternatively, the cap sections may be disposed about the end loops in a clamshell-type manner. Of course, additional securing means may be desirable and may comprise, e.g., banding tapes disposed about the cap sections when assembled.

Figure 8:
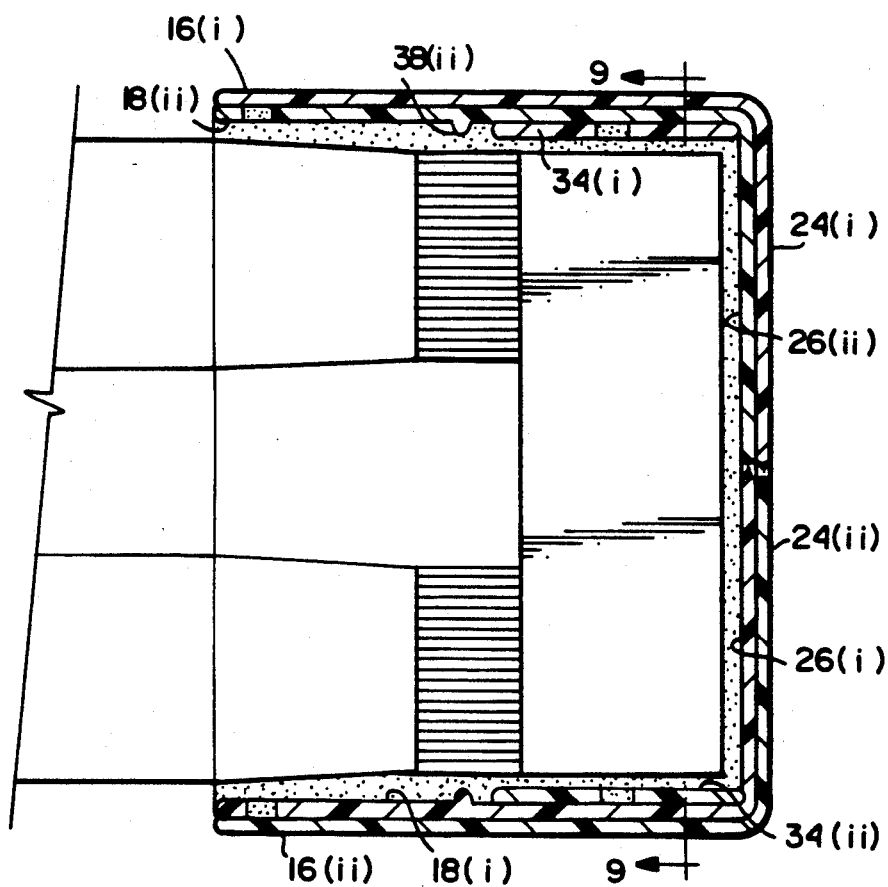
FIG. 8 is a view similar to FIG. 1 illustrating a different form of series loop for reception in the cap hereof.
Figure 9:
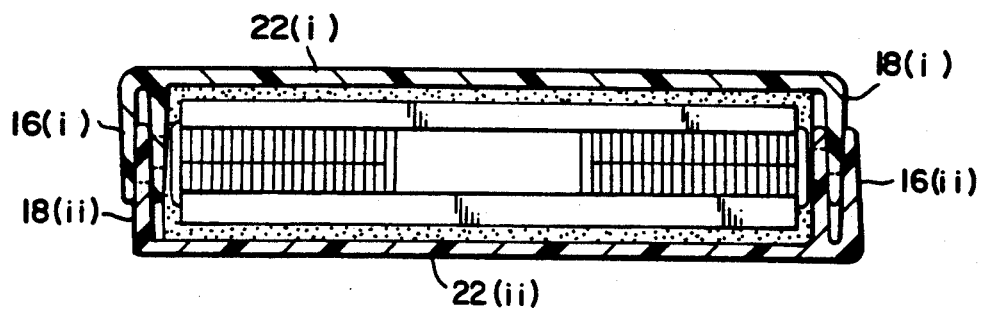
FIG. 9 is a cross-sectional view thereof taken about on line 9—9 in FIG. 8.
Figure 10:
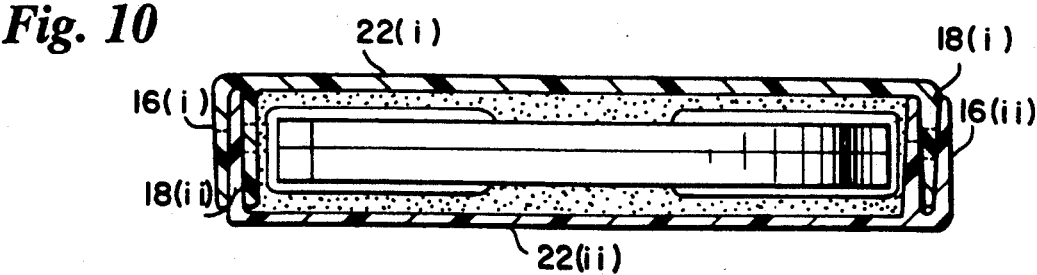
FIG. 10 is a cross-sectional view similar to FIG. 9 but illustrating the loop of FIGS. 1 and 2.

Referring to FIGS. 8 and 9, there is illustrated a series loop with a single-shot braze connection. This is a different form of series loop connection than the strand-to-strand braze connection illustrated in FIGS. 1 and 2. It will be appreciated that the single-shot braze connection requires a greater width than the strand-to-strand braze connection of FIGS. 1 and 2. This is clearly illustrated upon a comparison of FIGS. 9 and 10, which further illustrate the formation of a cap in selected widths to accommodate series loop connections of different widths.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A cap for disposition on a series loop of a bar wound armature of an electrical system, comprising: first and second substantially identical cap sections, each section having (i) first and second opposed generally parallel longitudinally extending side walls, (ii) an end wall extending generally transversely between said side walls adjacent one end of said section and (iii) a cover extending between said side walls and from said end wall along one side of said cap section leaving free margins of said side and end walls along the opposite side of said cap section from said cover;

each said end wall having first and second generally parallel segments offset one from the other in a longitudinal direction generally parallel to said side walls with said second segment being inset longitudinally from said first segment, each said first end wall segment extending from said first side wall generally transversely toward said second side wall, each said second end wall segment extending from said second side wall generally transversely toward said first side wall, said first and second segments having edges inset from the free margin of said end wall at a location therealong intermediate said side walls;

said first and second sections being assembled to form the cap with (i) the first and second wide walls of said first section lying generally parallel and side-by-side with the respective second and first side walls of said second section, (ii) the first and second end wall segments of said first section lying in side-by-side generally parallel relation with the respective second and first segments of said second section, and (iii) the covers of said first and second sections spaced one from the other on opposite sides of the cap whereby said covers, said side walls and said end walls define an enclosure open at an end thereof opposite said end walls for receiving the series loop of a bar wound armature;

the inset edges of said first and second segments of said first section and the inset edges of the first and second segments of said second section enabling the respective side walls of the first and second cap sections and the respective end wall segments thereof to intermesh and thereby form the cap.

2. A cap according to claim 1 wherein the inset edges of said first and second segments are spaced selectively one from the other upon assembly to enable the sections to form a cap having selected widths between the opposed covers.

3. A cap according to claim 1 wherein each said section includes a tab spaced closely adjacent one of said side walls to define a slot therewith for receiving the opposite side wall of the other section when said sections are assembled one with the other.

4. A cap according to claim 3 including a rib projecting inwardly from said opposite side wall of each section, each said rib being spaced from said end wall of each section to enable disposition of the tab of the other section between said rib and said end wall.

5. A cap according to claim 3 wherein said tab extends longitudinally generally parallel to said one side wall defining an elongated slot for receiving the opposite side wall of the other section.

6. A cap according to claim 1 wherein a side wall of said first section lies within said enclosure and the other side wall of said first section lies outwardly of said enclosure when said first and second sections are assembled together to form said enclosure.

7. A cap according to claim 1 wherein said first segments of said first and second sections lie outwardly of and form an outer wall for said enclosure and said second segments of said first and second sections lie inwardly of and form an inner wall for said enclosure when said sections are assembled together to form said enclosure.

8. A cap according to claim 1 including means carried by said section for securing said sections in assembled relation one to the other.

9. A cap according to claim 8 wherein said securing means includes means within said enclosure defining at least one opening and a resin material in said opening.

10. A cap according to claim 8 wherein each said section includes a tab extending generally parallel to said side walls and spaced closely adjacent one of said side walls to define a slot therewith for receiving the opposite side wall of the other section when said sections are assembled one with the other, said securing means including an opening in said tab and a resin material in said opening.

11. A cap according to claim 1 wherein said inset edges lie in opposite sides of a median between said side walls.

12. A cap according to claim 1 in combination with the loops of the bar wound armatures, said cap enclosure being fitted over at least one of said loops and means for retaining said cap on said one loop.

13. A cap according to claim 11 including a resin material within said enclosure about said one loop.

14. A cap enclosure portion for disposition on a loop of a bar wound armature of an electrical system, comprising:
a cap section having (i) a pair of opposed generally parallel longitudinally extending side walls, (ii) an end wall extending generally transversely between said side walls adjacent one end of said section and (iii) a cover extending between said side walls and from said end wall along one side of said cap section leaving free margins of said side and end walls along an opposite side of said cap section;
said end wall having first and second generally parallel segments offset one from the other in a longitudinal direction generally parallel to said side walls with said second segment being inset longitudinally rom said first segment, said first and second end wall segments each extending transversely from a respective side wall generally toward the opposite side wall;
said first and second segments having edges inset from the free margin of said end wall and defining an opening in said end wall and which opening opens through the margin of said end wall;
said section further including a longitudinally extending tab spaced closely adjacent and substantially parallel to one of said side walls to define a slot therewith having a width at least equal to the width of the opposite side wall section.

15. A cap enclosure portion according to claim 14 including a rib projecting inwardly from said opposite side wall of said section, said rib being spaced from said end wall of said section a distance greater than the longitudinal extent of said tab.

16. A cap enclosure portion according to claim 14 including at least one opening through said tab.

17. A cap enclosure portion according to claim 14 including at least one opening in said opposite side wall.

18. A cap enclosure portion according to claim 14 wherein said segment edges are inclined relative to one another in a direction toward one another and toward said cover and lie substantially medially of the extent of said side wall.

19. A cap for disposition on a loop of a bar wound armature of an electrical system, comprising:
first and second substantially identical cap sections, each said section having (i) a pair of opposed generally parallel longitudinally extending side walls, (ii) an end wall extending generally transversely between said side walls adjacent one end of said section and (iii) a cover extending between said side walls and from said end wall along one side of said cap section leaving free margins of said side and end walls along an opposite side of said cap section;
each said end wall having first and second generally parallel segments offset one from the other in a longitudinal direction generally parallel to said side walls with said second segment being inset longitudinally from said first segment, said first and second segments having edges defining a portion inset from the free margin of said end wall and disposed substantially medially of said end wall;
said first and second sections being assembled to form the cap with (i) the side walls of said first section lying in generally parallel juxtaposition with the respective side walls of said second section, (ii) the first and second end wall segments of said first section lying in side-by-side generally parallel relation with the respective second and first segments of said second section, and (iii) the covers of said first and second sections lying in spaced opposition one to the other whereby said covers, said side walls and said end walls define an enclosure open at the end thereof opposite said end walls for receiving the loop of the bar wound armature;
the inset portions of said first and second cap sections enabling offset intermeshing of said sections in a transverse direction when assembled to form a cap.

20. A cap according to claim 19 wherein each said section includes a longitudinally extending tab spaced closely adjacent and generally parallel to one of said side walls to define a slot therewith for receiving the opposite side wall of the other section when said sections are assembled one with the other.

21. A cap according to claim 20 including a rib projecting inwardly from said opposite side wall of each section, each said rib being spaced from said end wall of each section to enable disposition of the tab of the other section between said rib and said end wall.

22. A cap according to claim 19 wherein a side wall of said first section lies within said enclosure and the other side wall of said first section lies outwardly of said enclosure when said first and second sections are assembled together to form said enclosure, said first segments of said first and second sections lying outwardly of and forming an outer wall for said enclosure and said second segments of said first and second sections lying inwardly of and forming an inner wall for said enclosure when said sections are assembled together to form said enclosure, and means carried by said section for securing said sections in assembled relation one to the other.

23. A cap according to claim 19 wherein said sections are aligned relative to one another in the longitudinal direction when intermeshed to form the cap.

* * * * *